Nov. 27, 1962 H. W. MOLZAHN 3,065,734
UNITARY WORKING CYLINDER WITH PISTON RETAINING MEANS
Filed Sept. 5, 1961

Inventor:
Herbert W. Molzahn
Paul O. Pippel
Atty.

United States Patent Office 3,065,734
Patented Nov. 27, 1962

3,065,734
UNITARY WORKING CYLINDER WITH PISTON RETAINING MEANS
Herbert W. Molzahn, Hamilton, Ontario, Canada, assignor to International Harvester Company, Chicago, Ill., a corporation of New Jersey
Filed Sept. 5, 1961, Ser. No. 136,021
5 Claims. (Cl. 121—38)

This invention concerns a fluid pressure operated piston and cylinder assembly. More particularly, the invention relates to a simplified construction for a working cylinder and means for retaining its associated piston therein.

It is an object of this invention to provide a working cylinder assembly with a minimum of machined surfaces thereon, resulting in ease and reduced cost of fabrication during the manufacturing process.

Another object of this invention is to provide a unique fluid pressure operated piston and cylinder assembly which eliminates the need for a removable cylinder head, thus eliminating the problem of pressure sealing between the head and cylinder.

A further object of this invention is to provide a fluid pressure operated piston and cylinder assembly having a cylinder which may be formed as a single unit or which may be of permanently welded construction.

Still another object of this invention is the provision of fluid pressure operated piston and cylinder assembly having a piston with a threaded extension thereon to which is threaded a retaining nut having one dimension thereof small enough so that the nut may be inserted through the piston bore.

An additional object of this invention is the provision of a fluid pressure operated piston and cylinder assembly having a piston retaining nut which may be mounted on its associated piston while within the cylinder, thereby eliminating the problems of assembly and insertion normally associated with such assemblies.

Additional objects of this invention will become apparent to those skilled in the art upon examination of the following description in connection with the accompanying drawing in which.

Figure 1:
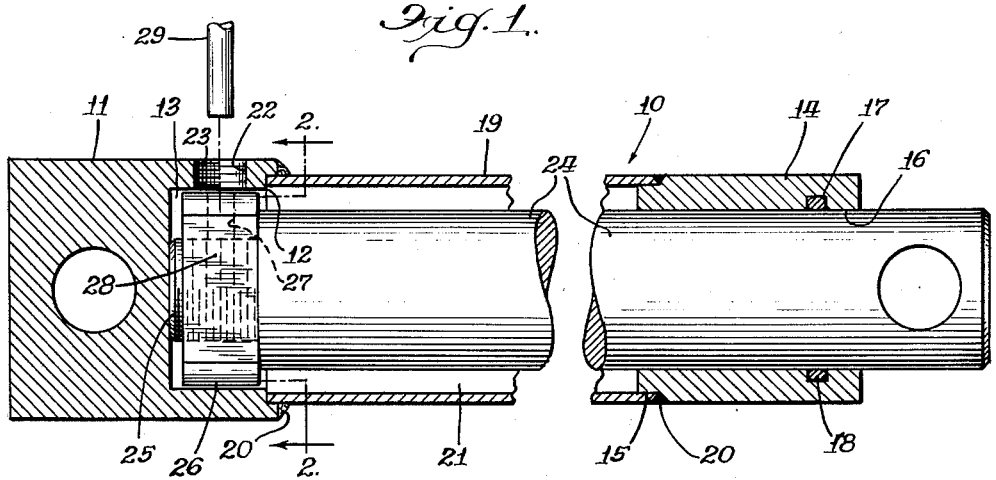
FIG. 1 is a side elevational view, partly in section, of the piston and cylinder assembly showing the retaining nut in its mounted position.

Referring now to the drawing, it will be seen that the cylinder 10 comprises the end portion 11 having an internal recess 12 in one end thereof. The end portion 11 of cylinder 10 has additionally an axial bore 13 which is concentric with recess 12. Cylinder 10 is further provided with the end portion 14 having an outwardly facing recess 15 thereon opposite recess 12 of end portion 11. Additionally, end portion 14 has an axial bore 16 extending completely therethrough opposite bore 13 of end portion 11. Within bore 16 is formed the concentric axial groove 17 and in this groove is positioned the sealing ring 18 which may be, for example, of the neoprene type. The cylindrical element 19 is fitted into inwardly facing recess 12 of end portion 11 and outwardly facing recess 15 of end portion 14 and is solidly affixed thereto as by welding, as shown at 20. Thus is formed an axial chamber or barrel 21 including an extension formed by bore 13 which is in axial alignment with bore 16. Additionally, end portion 11 of cylinder 10 has a transverse passage or bore 22 including the threads 23 communicating with axial bore 13. During normal operation suitable lines and fittings interengage threads 23 of passage 22 and communicate with a source of fluid pressure.

The piston 24 is slidably received within bore 16 of end portion 14 and is adapted to reciprocate within chamber 21 and its extension formed by bore 13. From one end of piston 24 extends the element 25 upon which is threaded the retaining nut 26. It will be seen that in the extreme position of the piston within the cylinder as shown in FIG. 1, retaining nut 26 is received within the extension formed by axial bore 13 adjacent the transverse passage 22. Retaining nut 26 has a transverse bore therein as shown at 27. Bore 27 is formed to align with passage 22 when the piston is in the position shown in FIG. 1.

Figure 2:
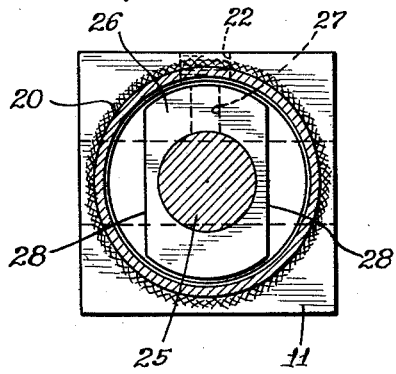
FIG. 2 is a sectional view taken along the lines 2—2 of FIG. 1.
Figure 3:
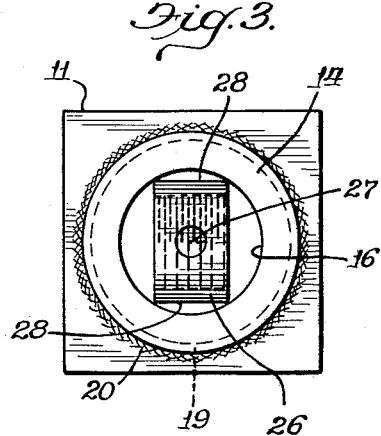
FIG. 3 is an end view of the cylinder showing the retaining nut in position for insertion into or removal therefrom.

The retaining nut 26 has formed thereon two flat portions 28, as clearly shown in FIG. 2. These flat portions result in an outside dimension of the retaining nut 26 which is smaller than the diameter of bore 16 so that nut 26 may be slidably received through bore 16 when tilted to the position shown in FIG. 3.

In operation the nut 26 is inserted through bore 16 into chamber 21. A pin 29 is inserted through passage 22 and into engagement with bore 27 of nut 26. Piston 24 is then entered into chamber 21 and threaded into retaining nut 26 while movement of nut 26 is restrained by means of pin 29. Once the nut 26 has been threaded onto shaft 25 the pin 29 is removed and suitable fluid control lines are engaged with the threads 23 of the bore 22, allowing for pressure to be applied so that the cylinder may be operated in the normal manner.

The unitary construction of the cylinder assembly may be attained by means of welding cooperating units together, as shown, or alternatively, the cylinder may be cast or otherwise formed as a single unit. Such formation eliminates entirely the pressure sealing problems associated with removably coupling a cylinder head and cylinder barrel.

While the retaining nut has been shown with two flat portions thereon to allow for insertion and removal through the piston bore, it is to be understood that a conventional nut without flats may be permanently installed within the chamber during assembly of the cylinder. Although this will result in a situation where the nut is not removable from the barrel, the likelihood of the nut requiring replacement is small and the resultant reduction in the number of machining operations to be performed in assembly of the unit amounts to a considerable saving.

Although a preferred embodiment of this invention has been shown and described herein, it is to be understood that changes and modifications can be made thereto by persons skilled in the art without deviating from the scope of the invention which should be contrued by the terms of the following claims.

What is claimed is:

1. In combination, a piston and cylinder assembly comprising an unitary cylinder housing having two end portions and an intermediate portion defining an axial chamber, one of said end portions having an axial bore of smaller diameter than said chamber, a piston slidably received in said bore and adapted to reciprocate in said chamber, means defining a transverse passage in another of said portions communicating with said chamber, said piston having an axial threaded extension thereon, and a nut of greater diameter than said piston threaded on said extension, said nut having means defining a transverse bore therein whereby a rod may be inserted through the transverse passage and into the transverse bore in order to restrain the nut from rotating as the piston is threadedly engaged therewith.

2. In combination, a piston and cylinder assembly comprising an unitary cylinder housing having two end portions and an intermediate portion defining an axial chamber, one of said end portions having an axial bore of smaller diameter than said chamber, means defining a transverse passage in another of said portions communicating with said chamber, a piston slidably received in said bore and adapted to reciprocate in said chamber, said piston having an axial threaded extension thereon, and a nut of greater diameter than said piston threaded on said extension and having at least one dimension smaller than the diameter of said axial bore whereby said nut may be passed through the axial bore, and means defining a transverse bore in said nut whereby a rod may be inserted through the transverse passage and into the transverse bore in order to restrain the nut from rotating as the piston is threadedly engaged therewith.

3. In combination, a piston and cylinder assembly comprising an unitary cylinder housing having two end portions and an intermediate portion defining an axial chamber, one of said end portions having means defining an axial bore therethrough of smaller diameter than said chamber, another of said portions having means defining a passage communicating with said chamber, a piston slidably received in said bore and adapted to reciprocate in said chamber, said piston having restraining means of greater diameter than said bore mounted thereon within said chamber whereby reciprocation of said piston is limited by engagement of said restraining means and said one end portion, said restraining means having a transaxial dimension less than the diameter of said bore so as to be passable through said bore and having means defining a bore therein whereby an external element may be inserted through said passage and into said bore in order to effect engagement of said restraining means and said piston.

4. The invention according to claim 3, said restraining means comprising a nut threadedly engageable with said piston.

5. The invention according to claim 4, said passage in the other of said portions being transverse to the axis of said chamber, and said bore in said nut being alignable with said transverse passage.

References Cited in the file of this patent

UNITED STATES PATENTS

| | | |
|---|---|---|
| 2,724,368 | Miller | Nov. 22, 1955 |
| 2,915,046 | Larsen et al. | Dec. 1, 1959 |
| 2,987,046 | Atherton | June 6, 1961 |
| 2,997,026 | Zimmerer | Aug. 22, 1961 |